United States Patent [19]

Womick

[11] Patent Number: 4,788,792

[45] Date of Patent: Dec. 6, 1988

[54] CONTAINER APPARATUS

[76] Inventor: Michael S. Womick, 2905 Larson St., Kissimmee, Fla. 32741

[21] Appl. No.: 39,386

[22] Filed: Apr. 17, 1987

[51] Int. Cl.⁴ .......................... A47G 7/02; A01G 9/02
[52] U.S. Cl. ....................................... 47/41.12; 47/66
[58] Field of Search .................... 47/66, 41.1, 41.12, 47/86, 39; 220/23.83, 23.86, 23.4

[56] References Cited

U.S. PATENT DOCUMENTS

| 986,395 | 3/1911 | King | 220/23.4 |
|---|---|---|---|
| 2,799,972 | 7/1957 | Teixeira | 47/66 |
| 3,368,303 | 2/1968 | Duncan Tong | 47/41.12 |
| 3,747,268 | 7/1973 | Linder | 47/66 |

FOREIGN PATENT DOCUMENTS

| 2433036 | 1/1926 | Fed. Rep. of Germany | 47/39 |
|---|---|---|---|
| 31334 | 11/1920 | Norway | 220/234 |

Primary Examiner—Robert A. Hafer
Assistant Examiner—Danton D. DeMille
Attorney, Agent, or Firm—William M. Hobby, III

[57] ABSTRACT

A container apparatus provides separate support for floral decoration and live plants, and has an outer container with encircling walls and a bottom with a center core of floral decoration supporting material positioned in a center container in the center of the outer container. A plurality of arcuate plant containers are positioned around the center core of floral decoration and center container for holding live plants and each supporting the center floral decoration supporting material and center container.

10 Claims, 1 Drawing Sheet

CONTAINER APPARATUS

BACKGROUND OF THE INVENTION

The present invention relates to containers for supporting live plants and floral decoration is separate removable components of one display container.

In the past, it has been common to provide a great variety of vases, pots and other containers for floral decoration in which florists can deliver floral arrangements of cut flowers as well as artificial floral decorations. Typically, these containers can be filled with a floral decoration support material, commonly referred to as floral foam, and which may be a rigid polyurethane foam polymer, which is easily shaped for insertion into a container. Prior to the wide use of floral foam, it was common to have supporting bases having a plurality of pointed supporting prongs for placement in the bottom of a vase or to have vases with narrowed necks for supporting cut flowers. It has also been common in the past to utilize various pots and containers for supporting live plants. Sometimes these containers are simple, inexpensive plastic containers for growing and selling live plants for replanting, but various containers are also provided for growing live plants on the interior of buildings. These pots are generally of a more decorative nature and may be large colored plastic pots for supporting small trees and bushes or small desk top containers for supporting foliage plants, and the like.

Prior U.S. Patents for containers may be seen in the Chetta, Jr., U.S. Pat. No. 3,984,941 for a table top waste receptacle having an opening in the center thereof for supporting plant like decorations. In the Dimich U.S. Pat. No. 4,583,322, an ornamental container and display assembly is shown for a seedling plants which may be attached to a christmas tree, or the like.

In U.S. Patent to Lewandowski, et al., U.S. Pat. No. 4,387,534, a book end planter is shown for growing a live plant in combination with a book end and book support and calendar mount.

In contrast to these prior art devices, the present invention relates to a container for supporting separate floral decoration and separately supported live plant containers therein, and which can be assembled rapidly in different combinations to produce decorative floral arrangements.

SUMMARY OF THE INVENTION

The present invention relates to a container for supporting, separately, floral decorations in floral foam and live plant containers supporting live plants in potting soil. The container apparatus includes an outer container having encircling walls and a bottom with a center core of floral decoration supporting material, such as floral foam located in the center portion of the outer container, and a plurality of plant containers positioned around the center core of floral decoration supporting material in the outer container, each for holding potting soil and plants therein, so that a container can have both flora decoration supported in the center core of supporting material surrounded by live plants growing in separate containers. The center core of floral decoration supporting material and surrounding containers can be rapidly assembled in different combinations. The live plant containers can each be of a general pie slice shape with the point cut off in an arcuate circle for supporting a container in the center of the plurality of plant containers surrounding the center. The floral foam can be placed in a separate container which can be rapidly inserted into the combination.

BRIEF DESCRIPTION OF THE DRAWINGS

Other objects, features and advantages of the present invention will be apparent from the written description and the drawings in which.

DESCRIPTION OF THE PREFERRED EMBODIMENTS

Figure 1:
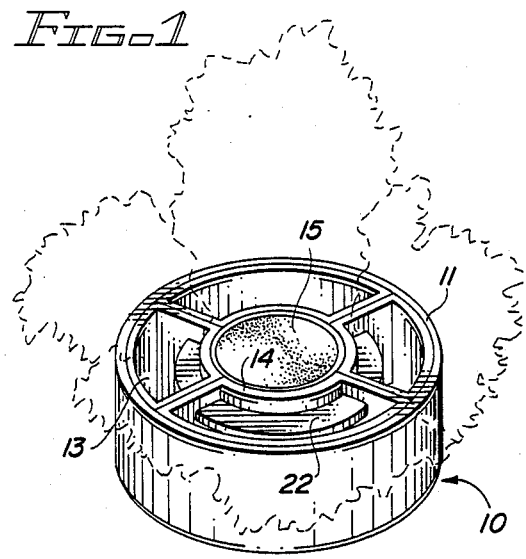
FIG. 1 is a perspective view of a floral decoration and live plant supporting container in accordance with the present invention.
Figure 3:
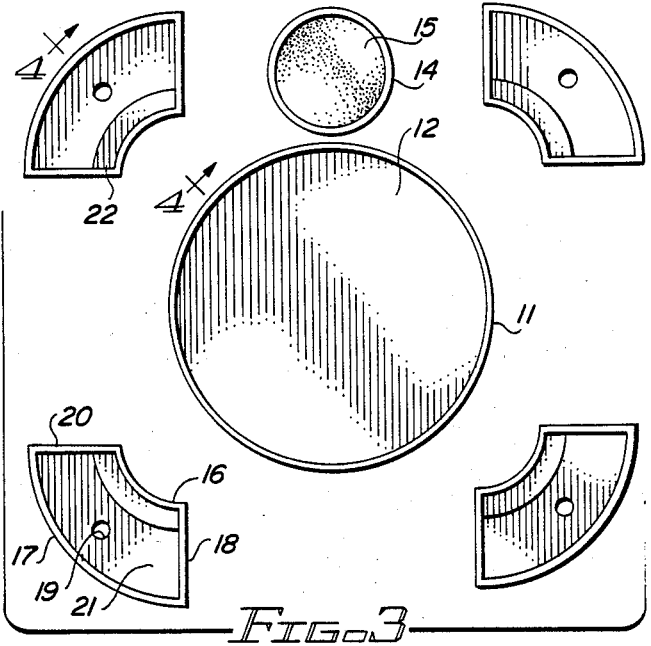
FIG. 3 is a separated view of the container of FIGS. 1 and 2.
Figure 4:
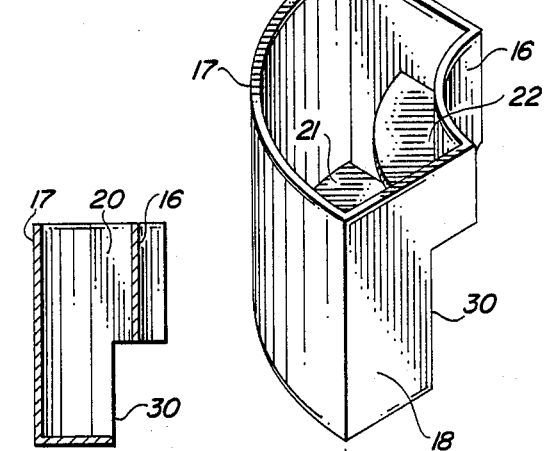
FIG. 4 is a sectional view taken on line 4—4 of FIG. 3.
Figure 2:
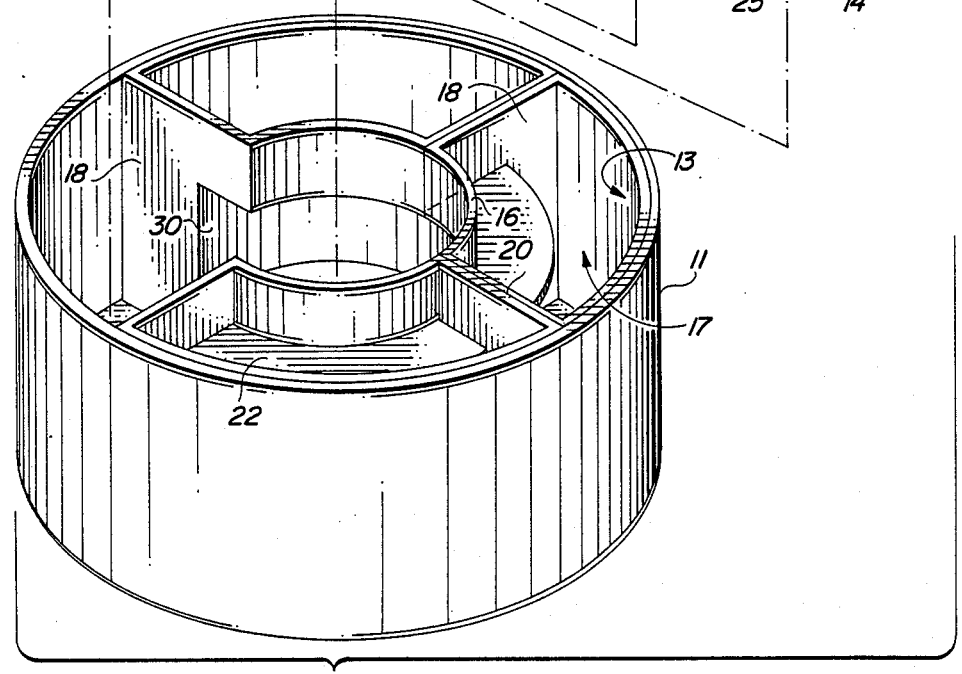
FIG. 2 is an exploded view of the container of FIG. 1.

Referring to FIGS. 1 through 4 of the drawings, a combination container 10 is seen having an outer circular wall 11 and a bottom 12. The outer container 11 is shown with four arcuate containers 13 placed around a center container 14 so that the arcuate containers 13 are positioned and stabilized between the center container 14 and the outer container walls 11. The center container 14 is filled with a floral foam 15 for supporting cut flowers or other decorative materials used in floral and plant arrangements. The floral foam has been cut to the shape of the cylindrical container 14, but it should be clear that the floral foam 15 can be used without the container 14 if desired. Each of the containers 13 is of a general pie slice shape except that the point has been cut off with an arcuate wall 16 following the same angular path as the outer arcuate inner wall 17. The wall 16 of each of the containers 13 line up as illustrated in FIG. 1 and 2 to form a circular center portion. Each of the containers 13 has a pair of side walls 18 and 20 along with a bottom 21 having an opening 19 therein. The bottom 21 includes a bottom stepped ledge 22 adjacent the wall 16 to form an open space 29 under the edge 22. Thus, with all the pie shaped containers 13 are placed inside the outer wall 11, and form an outer circle with the walls 17 adjacent to the walls 11 and an inner circle formed of the walls 16 forming a cylindrical center portion. A second inner circle wall is made up of the connected walls 30 when the containers 13 are all placed in the outer wall 11. The container 14 has a plurality of openings 25 in the bottom sides thereof to allow moisture to communicate between the container 14 and the space formed by the walls 30 and ledge 22 and through the openings 19 into the containers 13. In the preferred embodiment, the floral foam 15 is inserted in the cylindrical container 14 which is supported by the connecting walls 16 of the live plant containers 13.

Each live plant container 13 would typically contain soil and have live plants planted therein, such as live foliage plants. Thus, the live foliage or other plants could be grown in a variety of types and sizes all placed in identical containers 13, so that when a florist has an order for a floral arrangement, he can take the larger outer container 11, select four containers 13 of his choice, and place within the outer container 11. He can then insert the container 14 with the floral foam 15 which may already have cut flowers or synthetic materials attached to the floral foam 15 to provide for a rapid assemblage of floral decoration for delivery to the customer. The live plants keep for long periods of time so that fresh plants are not needed on a regular basis, as in the case of cut foliage.

It should also be clear from the drawings, that while four containers 13 are illustrated, the container could have three of larger size or could have more than four without departing from the spirit and scope of the invention. The container 14 does not require a bottom, but one can be provided if desired. In addition, the unit can have a different shape other than the preferred round shape of the overall system.

It should be clear at this point that the container for separately supporting floral decoration and floral decoration support material, and separately supporting a plurality of containers with live plants has been provided. However, the present invention is not to be construed as limited to the forms shown which are to be considered illustrative rather than restrictive.

I claim:

1. A container for supporting separate containers for floral decoration and live plants comprising:
   an outer container having encircling walls and a bottom;
   a center core of floral decoration supporting material located in the center of said outer container; and
   a plurality of plant containers positioned around said center core of floral decoration support material in said outer container for holding potting soil and plants, therein; each of said plurality of plant containers having a stepped bottom and spaced arcuate inner walls so that an arcuate space is formed beneath the stepped bottom around said center core of floral decoration supporting material, whereby a container can having floral decoration supported in a center core of supporting materials surrounding by live plants growing in separate plant containers.

2. A container in accordance with claim 1 in which said outer container has cylindrical walls.

3. A container in accordance with claim 2 in which said center core of floral decoration is cylindrical shaped floral foam.

4. A container in accordance with claim 3 in which said cylindrical shaped floral foam is supported in a central container.

5. A container in accordance with claim 4 in which said plurality of plant containers each has an arcuate plant container positioned between said center core of floral decoration supporting material and said outer container encircling walls.

6. A container in accordance with claim 5 in which each of said arcuate plant containers has arcuate inner and outer walls for forming a segmented encircling containers encircling said center core of floral decoration supporting material.

7. A container in accordance with claim 6 in which each said plurality of plant containers positioned around said center core of floral decoration supporting material has at least one aperture in the bottom thereof.

8. A container in accordance with claim 7 in which said outer container is formed of a polymer material.

9. A container in accordance with claim 8 in which each of said plurality of plant containers is made of a polymer material.

10. A container in accordance with claim 9 in which each of said center containers has a plurality of openings therein.

* * * * *